United States Patent [19]

Hirai

[11] 4,091,154

[45] May 23, 1978

[54] DECORATIVE SYNTHETIC RESIN SHEETS HAVING THREE-DIMENSIONAL PATTERN FOR WALLS, CEILINGS OR FURNITURE AND PROCESS FOR MANUFACTURING SAME

[75] Inventor: Junichiro Hirai, Osaka, Japan

[73] Assignee: Tokiwa Leather Industrial Co., Ltd., Japan

[21] Appl. No.: 694,487

[22] Filed: Jun. 9, 1976

[30] Foreign Application Priority Data

Jun. 20, 1975 Japan .................................. 50-76251

[51] Int. Cl.² ...................... B29D 27/00; B29C 21/00; B29D 7/20
[52] U.S. Cl. .................................... 428/158; 264/46.4; 264/48; 264/129; 264/245; 264/259; 264/293; 264/321; 427/244; 427/258; 427/336; 427/278; 427/374 B; 428/314
[58] Field of Search .................... 264/46.4, 46.6, 46.3, 264/46.2, 45.8, 54, DIG. 60, 129, 132, 134, 136, 255, 321, 341, 259, 284, 293, 162, 171, 212, 232, 245, 246, 265, 48; 427/273, 307, 336, 372, 244, 277, 278, 258, 374 B; 428/158-160, 141, 195, 211, 314, 315; 156/77-79, 196, 668

[56] References Cited

U.S. PATENT DOCUMENTS

| | | | |
|---|---|---|---|
| 2,918,702 | 12/1959 | Wetterau | 264/45.8 |
| 2,943,949 | 7/1960 | Petry | 264/46.3 |
| 2,961,332 | 11/1960 | Nairn | 264/46.3 |
| 3,170,974 | 2/1965 | Jacobs | 264/284 |
| 3,192,063 | 6/1965 | Donofrio | 427/307 |
| 3,359,352 | 12/1967 | Powell et al. | 264/54 |
| 3,506,749 | 4/1970 | Weissman | 264/321 |
| 3,560,322 | 2/1971 | Magid | 428/160 |
| 3,591,401 | 7/1971 | Snyder et al. | 264/132 |
| 3,887,409 | 6/1975 | McCreary et al. | 264/321 |
| 3,887,678 | 6/1975 | Lewicki | 264/321 |
| 3,905,849 | 9/1975 | Bomboire | 428/320 |
| 3,932,245 | 1/1976 | Erb et al. | 428/159 |
| 3,978,258 | 8/1976 | Faust et al. | 264/284 |

OTHER PUBLICATIONS

Am. Modern Plastics Encyclopedia Charts, McGraw--Hill, N.Y. (1948).

*Primary Examiner*—Willard E. Hoag
*Attorney, Agent, or Firm*—Wenderoth, Lind & Ponack

[57] ABSTRACT

A decorative synthetic resin sheet having formed on its surface, a three-dimensional multi-colored pattern including protuberances and depressions distinctly defined with a marked difference in elevation therebetween. The sheet has a smooth planar rear surface which ensures good adhesion to the desired surface. The sheet is made by a process comprising a first step of coating one surface of a thin base sheet of paper or like material with a main synthetic resin composition containing a blowing agent, drying the resulting coating layer by heating and thereafter delustering the surface of the coating layer with a suitable solvent; a second step of fully foaming the coating layer by heating, then by reheating only a surface of the foamed layer, after cooling and stabilizing the foamed layer, while leaving the unheated portion of said layer remote from said surface; a third step of hot-embossing the reheated foamed layer and cooling the embossed surface; and a fourth step of applying a synthetic resin composition containing a coloring agent only to the raised top surface of the resulting embossed pattern and cooling the sheet.

8 Claims, 7 Drawing Figures

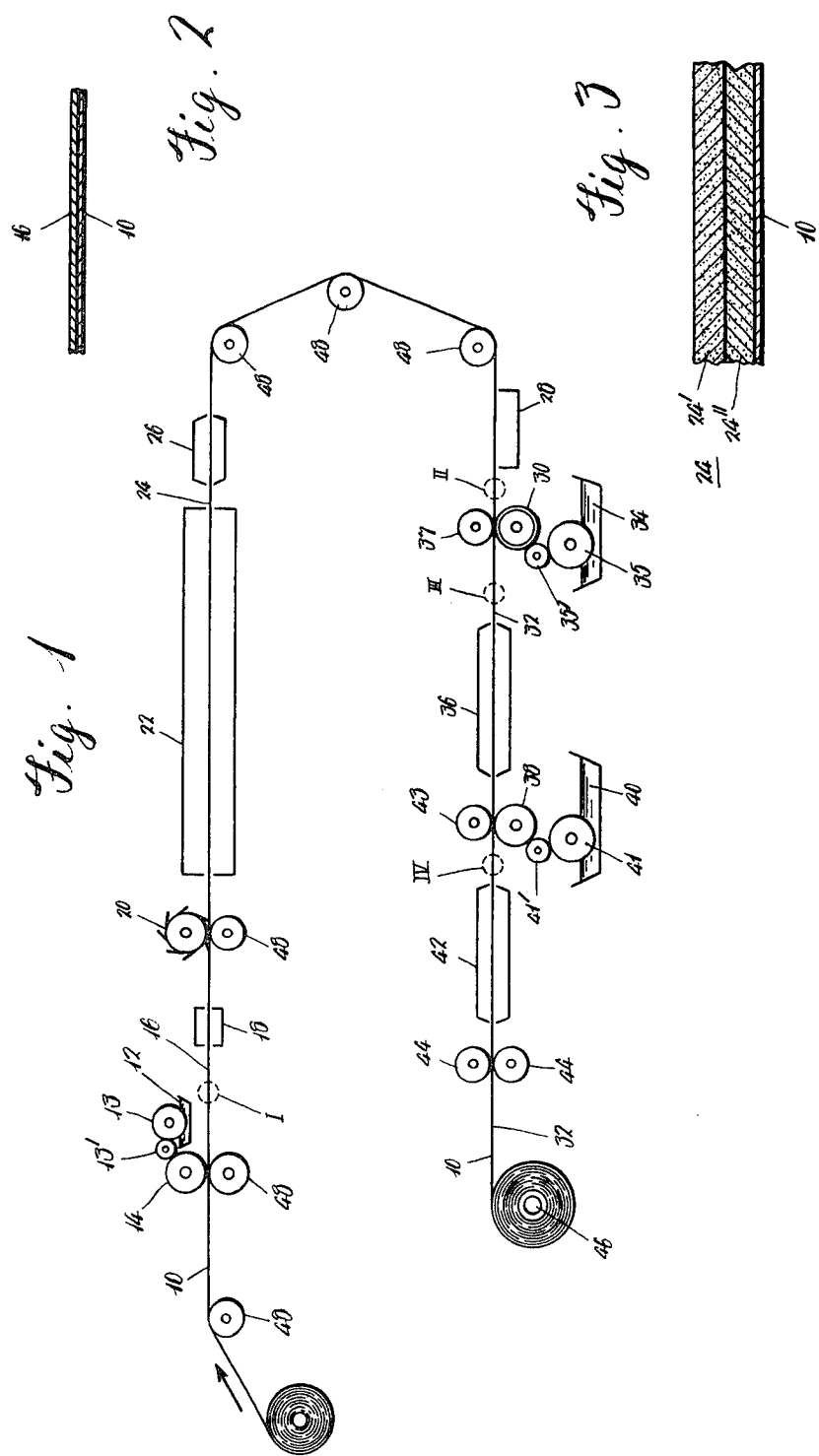

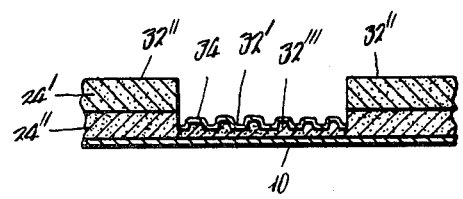
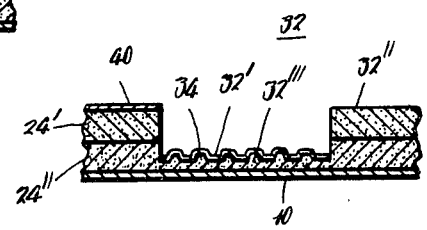
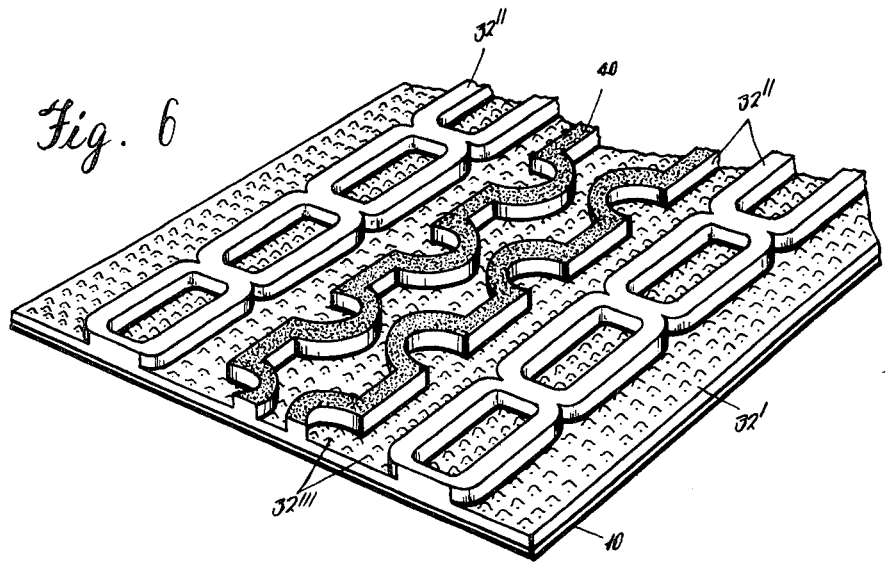
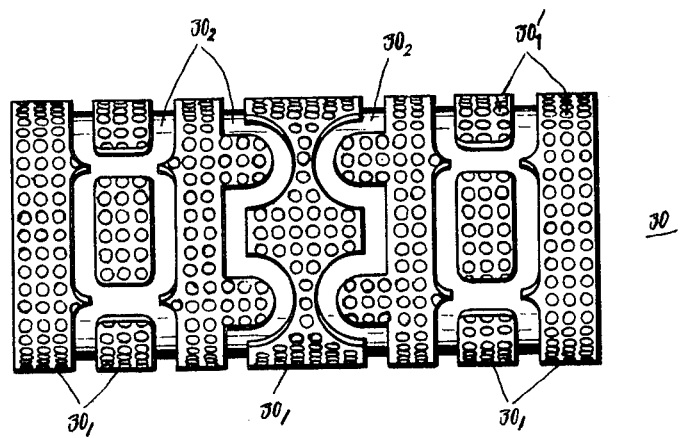

DECORATIVE SYNTHETIC RESIN SHEETS HAVING THREE-DIMENSIONAL PATTERN FOR WALLS, CEILINGS OR FURNITURE AND PROCESS FOR MANUFACTURING SAME

BACKGROUND OF THE INVENTION

The present invention relates to decorative synthetic resin sheets having a three-dimensional pattern and prepared by forming a foamed synthetic resin layer on one surface of a thin sheet of paper or like material which can be easily effectively adhered to surfaces of walls, ceilings or furniture, the synthetic resin layer having a three-dimensional, multicolored, embossed pattern. The invention relates also to a process for manufacturing the decorative sheets.

Decorative synthetic resin sheets must fulfill the following requirements. Decorative sheets must be readily attachable to walls or like surfaces with durable and effective bond strength. Moreover, they must have a beautiful and attractive appearance. Accordingly a three-dimensional pattern, if formed on the surface in markedly raised relief with distinctly outlined depressions and protuberances, will be aesthetically superior to a planar pattern.

Decorative synthetic resin sheets heretofore available comprise a thin synthetic resin sheet which is adapted to be adhered directly to a wall or like surface, so that they have a greatly reduced adhering ability. Especially in a cold climate, the resin sheet tends to harden to a warped state and is liable to separate from the surface. It has been desired to remedy these drawbacks.

Furthermore if it is attempted to produce a three-dimensional pattern on the surface of the decorative sheet, the pattern portion raised on the front surface will have a recess on the rear side, creating a clearance between the sheet and the surface to which it is affixed, consequently imparting an adverse effect to the adhesion of the sheet.

In order to overcome the foregoing disadvantages, a decorative sheet has been developed which is prepared by foaming a synthetic resin material containing a blowing agent and thereafter embossing the foamed sheet to create an embossed pattern on the surface. However, the embossed pattern has a very small difference (usually up to 0.8 mm) in elevation between the raised portion and the depressed portion, and it has been impossible to produce protuberances and depressions which are distinctly and sharply defined. Furthermore, it has been entirely impossible to impart different colors to the depressed bottom surface and the raised top surface respectively to produce a multi-color pattern. Consequently the decorative sheet obtained has a poor three-dimensional aesthetic effect.

Accordingly it has been suggested to employ a second embossing step following the first. The second embossing operation is conducted in exactly the same manner as in the first operation after the resin has been foamed and subsequently embossed, so that the raised pattern portion produced by the first embossing step more or less resumes the original state upon re-heating, greatly reducing the difference in elevation between the raised portion and the depressed portion. The additional operation further reduces the sharpness of the edge of the raised portion, failing to define the raised portion and depressed portion as distinguished from each other by a sharp outline. Thus, the method suggested is also unable to provide a decorative synthetic resin sheet having a highly three-dimensional effect.

SUMMARY OF THE INVENTION

The object of this invention is to overcome the foregoing drawbacks of conventional decorative synthetic resin sheets and to provide decorative synthetic resin sheets having a highly three-dimensional pattern which are effectively and readily bondable to walls and furniture.

According to this invention, a thin base sheet of paper, nonwoven fabric, canvas or like material is uniformly impregnated and coated, over one surface thereof, with a synthetic resin coating composition containing a blowing agent; the coated sheet is then dried by heating at a temperature below the decomposition temperature of the blowing agent and the surface of the coating layer is thereafter delustered with a suitable solvent.

The synthetic resin layer is thereafter foamed by heating at the decomposition temperature of the blowing agent to obtain a foamed layer, which is subsequently coated for stabilization. The surface of the foamed layer is then reheated so as to soften a portion of the foamed layer adjacent a surface thereof, while leaving unheated a portion of the layer remote from said surface after coating and stabilizing the foamed layer.

The reheated foamed layer is immediately subjected to hot-embossing operation to form in the foamed layer an embossed pattern having a great difference (about 1.0 to 1.5 mm) in elevation between the raised portion and the depressed portion. At the same time, the embossing operation applies a synthetic resin coating composition to the depressed bottom surface for coloring and also produces fine projections on the bottom surface. The embossed foamed layer is thereafter cooled to reduce its surface temperature to a suitable level.

A synthetic resin coating composition is then applied to the entire area or only part of the raised top surface of the pattern on the surface of the foamed layer, and the sheet is cooled and dried again to complete the process.

BRIEF DESCRIPTION OF THE DRAWINGS

FIG. 1 is a schematic diagram showing the process for manufacturing a decorative sheet of this invention;

FIG. 2 is an enlarged view in vertical section of a portion I in FIG. 1 to show a base sheet uniformly impregnated and coated over one surface thereof with a main coating composition 12 containing a blowing agent;

FIG. 3 is an enlarged view in vertical section of a portion II in FIG. 1 to show the sheet bearing a foamed layer stabilized by coating and having a surface thereafter reheated;

FIG. 4 is an enlarged view in vertical section of a portion III in FIG. 1 to show the foamed layer immediately after it has been hot-embossed;

FIG. 5 is an enlarged view in vertical section of a portion IV in FIG. 1 to show an embossed pattern formed on the surface of the foamed layer with a coating composition 40 applied to the raised top surface of the pattern;

FIG. 6 is a fragmentary perspective view showing an example of finished decorative synthetic resin sheet of this invention; and FIG. 7 is a front view showing an example of calendar used for the hot-embossing operation.

DETAILED DESCRIPTION OF THE INVENTION

An embodiment of this invention will be described below in detail with reference to the drawings.

In the first step, a thin base sheet 10 of paper, nonwoven fabric or like material readily and effectively joinable with a synthetic resin coating composition and highly amenable to adhesion to wall or like surfaces is impregnated and coated, on one surface thereof, with a paste-like main composition 12 comprising 100 parts by weight of synthetic resin (polyvinyl chloride), 60 parts by weight of plasticizer (DOP), 39 parts by weight of desired coloring agent, 3 parts by weight of stabilizer, 5 parts by weight of blowing agent and 5 parts by weight of white pigment (zinc white) to form a coating layer 16 as shown in FIG. 2. The composition is applied to the base sheet 10 by intermediate rollers 13, 13' and coating roller 14. The coating layer 16 is dried by heating at a temperature of about 120° C within a drier 18. The surface of the layer 16 is then delustered by a brush roller 20 with use of a suitable solvent such as toluene and, at the same time, uniformly smoothened.

The surface delustering and smoothing treatment of the coating layer 16 in the first step facilitates and assures adhesion of coating compositions 34 and 40 to the coating layer 16 in the third and fourth steps to be described later.

In the second step, the coating layer 16 is foamed by heating at a temperature of about 190° C for about 2 minutes within a foaming chamber 22 to obtain about a 1.8 mm thick foamed layer 24, to which is then applied a cool air stream at about 10° C for about 20 seconds within a cooling chamber 26 to stabilize the foamed layer 24 by cooling. The coated sheet 10 is thereafter sent to a reheating device 28 by which the surface of the foamed layer 24 is reheated at a temperature of 150° C to obtain a surface layer 24' shown in FIG. 3 which substantially resumes the state immediately after the foaming. A lower layer 24'' beneath the layer 24 remains stabilized by cooling. More specifically, after the foam layer has been stabilized by cooling with a cool air stream at about 10° C for about 20 seconds, a surface portion thereof is adequately heated and softened by reheating only the surface of the foamed layer at a temperature of about 150° C, after the cooling, while leaving a portion of the layer remote from the surface unheated.

In the third step, the softened surface layer 24' of the foamed layer 24 is subjected to embossing operation by a hot-embossing calendar 30 formed on its outer peripheral surface with a desired pattern including recesses $30_2$ and projections $30_1$ having numerous fine dents $30_1{'}$ as seen in FIG. 7. The embossing operation produces in the foamed layer 24 an embossed pattern 32 including distinctly outlined depressed bottom surface 32' and raised top surface 32'' differing from each other by about 1.0 to 1.5 mm in elevation. The fine dents $30_1{'}$ in the embossing calendar 30 also produce numerous fine projections 32''' on the depressed bottom surface 32'. Furthermore when a paste-like coating composition 34 comprising 25% by weight of desired coloring agent, 10% by weight of plasticizer (DOP), 35% by weight of cyclohexanone and 30% by weight of polyvinyl chloride is applied to the surface of projections $30_1$ on the calendar 30 by means of intermediate rollers 35 and 35', the coating composition 34 can be applied for coloring to the depressed bottom surface 32' and fine projections 32''' thereon simultaneously with the embossing operation. FIG. 4 shows the embossed sheet thus prepared.

The embossed sheet is then cooled in a cooling device 36 with a cool air stream at about 10° C to cool the surface of the embossed pattern 32 to a suitable temperature, e.g. 40° to 70° C.

In a fourth step, a paste-like coating composition 40 comprising 30% by weight of polyvinyl chloride, 35% by weight of cyclohexanone, 10% by weight of plasticizer (DOP) and 25% by weight of coloring agent is applied by a coating roller 38 and intermediate rollers 41, 41' to the entire area or part of the raised top surface 32'' of the embossed pattern 32 cooled in the device 36 in the third step. The resulting sheet is shown in FIG. 5. Subsequently the sheet is cooled in a cooling device 42 with a cool air stream at about 10° C and further cooled from above and below by cooling rollers 44, 44.

The entire process consisting of the first to fourth steps, when completed, gives a finished decorative synthetic resin sheet shown in FIG. 6.

FIG. 1 further shows a take-up roller 46, cooling rollers 37, 43 and a feed roller 48. The number of such rollers may be varied in accordance with the length of the manufacturing process.

This invention has the following features. According to this invention, the foamed layer 24 is temporarily cooled within the cooling chamber 26 in the second step to stabilize the layer 24, which is then reheated by the reheating device 28 to obtain a surface layer 24' having resumed the state immediately after the foaming. In this third step, the surface of the foamed layer 24 is hot-embossed while the base sheet 10 is being supported by the cooling roller 37. Consequently the depressed bottom surface 32' of the pattern 32 and the raised top surface 32'' thereof differ from each other in elevation by a large amount (1.0 to 1.5 mm) which has never been expected from a conventional embossing operation. Moreover, the protuberances and depressions define each other by an extremely distinct and sharp outline, while the fine projections 32''' can be formed on the bottom surface 32' very distinctly, because the lower layer 24'' has been relatively stabilized by cooling when embossed.

The embossing operation according to this invention produces an embossed pattern 32 involving a marked difference (about 1.0 to 1.5 mm) in elevation between the depressed bottom surface 32' and the raised top surface 32''. For this reason, application of the coating composition 34 to the depressed bottom surface 32' and to the fine projections 32''', as well as application of coating composition 40 to the raised top surface 32'', can be carried out without smudging other portions to give the embossed pattern 32 the desired multiple color.

This invention has been described above with reference to the most preferred embodiment, to which, however, the invention is not limited. In place of polyvinyl chloride, polyvinylidene chloride, polyvinyl acetate or like synthetic resin is similarly usable as the resin component of the main composition 12 for the production of decorative foamed resin sheets of this invention. However, polyvinyl chloride is found to be most appropriate in view of the cost and various properties of the product such as tensile strength, resistance to heat, chemicals and weather, nonflammability, etc.

The plasticizers, stabilizers, blowing agents and white pigments usable for the main composition 12 include those usually used with polyvinyl chloride, such as are given below.

Plasticizers: DOP, DIOP (diisooctyl phthalate), DBP, etc.

Blowing agents: azodicarbonamide, azobisisobutyronitrile, etc.

Stabilizers: metal soaps.

White pigments: titanium dioxide and zinc white.

These may be selectively used as desired.

The cyclohexanone contained in the coating compositions 34 and 40 as a solvent for dissolving the coloring agent may be replaced by methyl ethyl ketone (MEK).

As the coloring agents to be incorporated into the main composition 12 and the composition 34, 40, those of any desired color may be used in specified amounts in accordance with the aesthetic effect to be given to the finished decorative sheet. Use of gold, silver or pearl coloring agents is effective.

The decorative sheet of this invention is formed on its surface with a highly three-dimensional embossed pattern including protuberances and depressions sharply distinctly defined, differing in elevation by about 1.0 to 1.5 mm and colored differently, respectively, to give an enhanced aesthetic effect. The depressed bottom surface of the pattern is further formed with numerous fine projections. According to this invention, such decorative synthetic resin sheet can be manufactured in quantities by a continuous operation. The base sheet, which is made of nonwoven fabric, paper, thin wood sheet, etc., is very readily bondable to a wall surface or the like with durable bond strength, because the rear surface of the base sheet remains smooth and planar without being affected by the foaming and embossing operations, permitting uniform application of adhesive and ensuring intimate contact over the entire surface thereof with the surface to which the sheet is affixed. Moreover the synthetic resin impregnating the sheet reinforces the structure, imparting to the sheet increased toughness against breakage. Despite the luxurious and beautiful appearance of the three-dimensional pattern, the sheet is lightweight because it is composed of a foamed layer.

What is claimed is:

1. A process for manufacturing a decorative synthetic resin sheet having a three-dimensional pattern suitable for a surface covering, comprising:
   (a) coating one surface of a thin base sheet with a paste-like composition consisting predominantly of a synthetic thermoplastic resin composition containing a plasticizer, a blowing agent, a stabilizer, a pigment and a coloring agent to form a coating layer on the base sheet, drying the coating layer by heating at a temperature below the decomposition temperature of the blowing agent and thereafter delustering the surface of the coating layer with a suitable solvent,
   (b) foaming the delustered coating layer by heating at a temperature at which the blowing agent decomposes to obtain a foamed layer, then cooling and stabilizing the foamed coating layer,
   (c) reheating only a surface of the foamed layer after cooling and stabilizing the foamed layer while leaving unheated a portion of said layer remote from said surface,
   (d) subjecting the surface of the foamed layer to hot-embossing immediately after the reheating and then cooling the embossed foam, and
   (e) applying a coating composition comprising a coloring agent, a plasticizer, a synthetic resin and a solvent only to the raised top surface of the resulting embossed pattern formed on the surface of the foamed layer by step (d) and cooling the resulting sheet.

2. The decorative synthetic resin sheet manufactured by the process of claim 1.

3. The process as defined in claim 1 wherein the synthetic resin in the coating layer on the base sheet is polyvinyl chloride.

4. The process as defined in claim 1 wherein a coating composition comprising a coloring agent of desired color, a plasticizer, a synthetic resin and a solvent is applied simultaneously with the hot-embossing operation to the depressed bottom surface of an embossed pattern to be formed in the surface of the foamed layer by the hot-embossing operation.

5. The process as defined in claim 4 wherein numerous fine projections are formed in the depressed bottom surface of the embossed pattern.

6. A process for manufacturing a decorative synthetic resin sheet having a three-dimensional pattern for a surface covering comprising the steps of:
   (a) coating one surface of a thin base sheet of paper with a paste-like main composition consisting predominantly of polyvinyl chloride and containing a plasticizer, a blowing agent, a stabilizer, a pigment and a coloring agent to form a coating layer on the base sheet, drying the coating layer by heating at a temperature of about 120° C and thereafter delustering and smoothing the surface of the coating layer with toluene,
   (b) foaming the delustered coating layer by heating at a temperature of about 190° C for 2 minutes to obtain a foamed layer, then cooling said layer with a cool air stream at about 10° C for about 20 seconds to stabilize said layer,
   (c) reheating only a surface of the foamed layer at a temperature of about 150° C after cooling while leaving unheated a portion of said layer remote from said surface,
   (d) subjecting the surface of the foamed layer to hot-embossing immediately after the reheating and then cooling the embossed surface with a cool air stream at about 10° C to reduce the surface temperature to 40° to 70° C, and
   (e) applying a coating composition having polyvinyl chloride as a predominant resin component and containing a coloring agent of the desired color and a plasticizer, to a raised top surface of the resulting embossed pattern formed on the surface of the foamed layer and cooling the resulting sheet with a cool air stream at about 10° C and thereafter by cooling rolls.

7. The decorative synthetic resin sheet manufactured by the process of claim 6 wherein an embossed pattern formed in the surface of the foamed layer of the decorative sheet includes depressions and protuberances differing from each other by about 1.0 to 1.5 mm in elevation.

8. The decorative synthetic resin sheet as defined in claim 7 wherein the embossed pattern includes a depressed bottom surface and a raised top surface which are colored in distinct colors, respectively.

* * * * *